United States Patent
Schwind et al.

(10) Patent No.: US 12,157,181 B2
(45) Date of Patent: Dec. 3, 2024

(54) SUPPORT FOR A TRANSMISSIVE OPTICAL ELEMENT, LASER PROCESSING DEVICE WITH SUCH SUPPORT, AND PROCESS OF ADJUSTING THE POSITION OF A TRANSMISSIVE OPTICAL ELEMENT USING SUCH SUPPORT

(71) Applicant: BYSTRONIC LASER AG, Niederönz (CH)

(72) Inventors: Tobias Schwind, Herzogenbuchsee (CN); Stefan Richard, Roggwil (CH); Martin Mumenthaler, Rohrbach (CH); Marco Tramontano, Zurich (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/293,789

(22) PCT Filed: Aug. 18, 2022

(86) PCT No.: PCT/EP2022/073078
§ 371 (c)(1),
(2) Date: Jan. 31, 2024

(87) PCT Pub. No.: WO2023/021138
PCT Pub. Date: Feb. 23, 2023

(65) Prior Publication Data
US 2024/0261894 A1    Aug. 8, 2024

(30) Foreign Application Priority Data
Aug. 20, 2021   (EP) ..................... 21192447

(51) Int. Cl.
*B23K 26/064*    (2014.01)
*G02B 7/02*    (2021.01)

(52) U.S. Cl.
CPC ............ *B23K 26/064* (2015.10); *G02B 7/022* (2013.01); *G02B 7/023* (2013.01); *G02B 7/026* (2013.01)

(58) Field of Classification Search
CPC .. G02B 7/1822; G02B 7/1824; G02B 7/1825; G02B 7/1827; G02B 7/02; G02B 7/021;
(Continued)

(56) References Cited

U.S. PATENT DOCUMENTS 10,670,825 B2 *   6/2020   Foes ................ B29C 66/30321
2010/0110570 A1   5/2010   Blanding et al.
(Continued)

FOREIGN PATENT DOCUMENTS

WO    WO2020207536 A1    10/2020

OTHER PUBLICATIONS

English Language Translation of WO2020207536 (A1).
OEE Workproduct—International Preliminary Report on Patentability for PCT/EP2022/073078, mailed Nov. 24, 2023.

*Primary Examiner* — Ephrem Z Mebrahtu
(74) *Attorney, Agent, or Firm* — BelayIP (57) ABSTRACT

A holder for a transmissive optical element is specified, having a frame and a mount for the transmissive optical element. The mount is mounted within the frame with two adjusting elements and with a guide pin arranged between the adjusting elements and its distance from the frame can be adjusted. The adjusting elements are each mounted in the frame so that they can pivot and are adjustable in their respective lengths independently of one another. The mount-side ends of the adjusting elements can each be pivoted in the mount and are attached so that they can be displaced in the longitudinal direction of the respective adjusting element. The frame-side end of the guide pin is fixed to the frame, and the frame-side end of the guide pin is pivotably mounted in the frame in the X and Y directions and slidable (Continued)

in the longitudinal direction of the guide pin. A method for adjusting the position of a transmissive optical element is also specified.

13 Claims, 4 Drawing Sheets

(58) Field of Classification Search
CPC ........ G02B 7/022; G02B 7/023; G02B 7/025; G02B 7/026; B23K 26/064
See application file for complete search history.

(56) References Cited

U.S. PATENT DOCUMENTS

| | | |
|---|---|---|
| 2011/0100968 A1 | 5/2011 | Lambert et al. |
| 2011/0292527 A1* | 12/2011 | Frankovich ............ G02B 7/005 359/824 |
| 2020/0398373 A1 | 12/2020 | Rataj et al. |

* cited by examiner

SUPPORT FOR A TRANSMISSIVE OPTICAL ELEMENT, LASER PROCESSING DEVICE WITH SUCH SUPPORT, AND PROCESS OF ADJUSTING THE POSITION OF A TRANSMISSIVE OPTICAL ELEMENT USING SUCH SUPPORT

CROSS REFERENCE TO RELATED APPLICATIONS

This application is a national stage of international application PCT/EP2022/073078, filed Aug. 18, 2022, which claims priority to European patent application 2021092447, filed Aug. 20, 2021, the content of both of which is herein incorporated by reference.

BACKGROUND OF THE INVENTION

Field of the Invention

The invention relates to a holder for a transmissive optical element of a laser processing device, a use of the same, a laser processing device, a method for adjusting the position of a transmissive optical element of a laser processing device, and a computer program product.

Description of Related Art

In laser processing devices, there are holders for transmissive optical elements with adjustment mechanisms that contain linear guides. Although linear guides enable precise adjustment of the optical elements, they are expensive and susceptible to wear. Other adjustment mechanisms result in non-reproducible and imprecise adjustment. Movable components of known adjustment mechanisms are also susceptible to material abrasion. US2010/110570 A1 discloses an optical element mount comprising an inner member suspended within an outer member by a plurality of flexures. A tangential flexure, substantially circumferential with respect to the inner member and the optical axis, provides a tangential constraint for Z-axis rotation. US2020/398373 A1 describes an optical device for shaping an electromagnetic wave, having an optical element positioned within beam propagation direction and an exciter means functionally connected to the optical element for inducing an oscillation of the focal point in at least one of an x direction and an y direction of a plane perpendicular to the beam propagation direction along a focal point oscillation path. A passive guide element can be arranged between the optical element and an attachment. According to US2011/100968 A1 a laser processing machine head, a laser processing machine head monitoring system, and a method of monitoring an optical element of a laser processing machine feature a light-transmissive optical element and an optical element holder defining a cavity in which the optical element is retained against rotation.

The object is to specify a mount for a transmissive optical element that enables the optical element to be adjusted with little wear, in a reproducible and precise manner.

This object is achieved by a holder for a transmissive optical element, a use of a holder, a laser processing device for laser processing, and a method for adjusting the position of a transmissive optical.

BRIEF SUMMARY OF THE INVENTION

One embodiment relates to a holder for a transmissive optical element of a laser processing device, having a frame for receiving in a laser beam guidance unit of the laser processing device, and having a mount for the transmissive optical element, wherein the transmissive optical element spans a plane in an X direction and a Y direction, wherein the mount is mounted within the frame with two adjusting elements offset at an angle of 80° to 100° to one another in or parallel to the plane and with a guide pin arranged in or parallel to the plane between, in particular centrally between, the two adjusting elements radially to the frame and is adjustable in the X direction and/or the Y-direction in each case at its distance to the frame; wherein the adjusting elements are each mounted in the frame such that they can pivot in the X and Y directions and are adjustable independently of one another in their respective length between the mount and the frame; the mount-side ends of the adjusting elements are each mounted in the mount in the X and Y directions so that they can pivot and are displaceable in the longitudinal direction of the respective adjusting element; the mount-side end of the guide pin is fixed to the mount; and the frame-side end of the guide pin is mounted in the frame such that it can pivot in the X and Y directions and is displaceable in the longitudinal direction of the guide pin.

By adjusting the length of at least one of the adjusting elements, the position of the mount can be changed within the frame in the X direction and/or Y direction. The adjusting elements can be pivoted in the frame. Furthermore, the mount-side ends of the adjusting elements and the frame-side end of the guide pin can be pivoted in the plane in the X and/or Y direction; for example, in each case on circular path segments. In addition, the mount-side ends of the adjusting elements can each be shifted in their longitudinal direction in the mount. Furthermore, the frame-side end of the guide pin can be displaced in its longitudinal direction in the frame. This provides stable mounting of the mount in the frame while a variety of positions of the mount within or parallel to the plane are achievable. The latter is promoted by the fact that the adjusting elements can be adjusted in length independently of one another. The holder thus enables a precise and reproducible adjustment of the mount in the X direction and in the Y direction. If a transmissive optical element for a laser beam is provided in the mount and the holder is arranged in a laser beam guidance unit, the transmissive optical element can be adjusted in the beam path of the laser beam at an angle, e.g., perpendicular, to the direction of propagation of the laser beam. For example, the optical element can be precisely centred in the beam path of the laser beam, wherein the optical axis of the optical element can be made substantially coincident with the central axis of the laser beam. The holder does not require linear guides to move the optical element. The adjustment mechanism implemented in the holder is low-wear, fully defined or very precisely adjustable and enables a quasi-linear change in position of the optical element. In this way, precise adjustment of the position of the transmissive optical element is possible without expensive linear guides.

The frame can have two through-openings for receiving the adjusting elements and the adjusting elements can be mounted, in particular elastically, in the respective through-opening for pivoting in the X and Y directions. The mount can have, on its outer side, a first recess and a second recess for receiving the mount-side end of the adjusting elements, wherein the first and the second recess are arranged complementary to the through-openings. In this way, a precise fit of the components of the holder is achieved. If the mount is connected to the frame via the adjusting elements, degrees of freedom of the adjusting elements and thus of the mount are made possible in the X and Y directions. This mounting of the mount within the frame also enables the mount to be highly stable during rapid movements of the laser beam guidance unit, in particular when the adjusting elements are mounted elastically.

The through-openings of the frame can be arranged offset by 90° and the first recess and the second recess of the mount can be arranged offset by 90°. The resulting spatial arrangement of the adjusting elements when they connect the frame and the mount enables a large number of achievable positions of the mount within the frame.

The frame may have a third recess on its inner side for receiving the frame-side end of the guide pin and the mount-side end of the guide pin may be fixed to the outer side of the mount in a position complementary to the third recess. This configuration promotes high stability of the holder when the laser beam guidance unit moves quickly.

The third recess can be arranged between the through-openings of the frame. The third recess can be arranged centrally between the through-openings of the frame. The guide pin may be secured between the first and second recesses of the mount. The guide pin may be fixed midway between the first and second recesses of the mount. These spatial arrangements promote the stability of the holder when the laser beam guidance unit moves and a large number of positions that can be reached for the mount within the frame.

At least one of the first recess and the second recess may be disc-shaped in the X and Y directions within the mount. This enables degrees of freedom for the adjusting elements and thus for the mount in the X and Y directions, while degrees of freedom perpendicular to the plane in the X and Y directions, i.e., in the Z direction, are avoided. At least one of the first recess and the second recess can have a disc-shaped first filling element that can be rotated in a circle within the respective recess in the X and Y directions. The first filling element can have a first guide for receiving the mount-side end of one of the adjusting elements. With these modifications, the accuracy of fit of the components of the holder and their stability is promoted. At the same time, wear and tear, for example, material abrasion of moving components that are in contact or coming into contact, is avoided.

The third recess can be disc-shaped within the frame in the X and Y directions. This enables degrees of freedom for the guide pin and thus for the mount in the X and Y directions, while degrees of freedom perpendicular to the plane in the X and Y directions, i.e., in the Z direction, are avoided. Furthermore, the third recess can have a disc-shaped second filling element that can be rotated in a circle within the third recess in the X and Y directions. The second filling element can have a second guide for receiving the frame-side end of the guide pin. In this way, the fitting accuracy of the components of the holder is promoted. These modifications also promote high stability of the holder when the laser beam guidance unit moves quickly. At the same time, wear and tear, for example, material abrasion of moving components that are in contact or coming into contact, is avoided.

At least one of the first recess and the second recess can have an opening to the outer side of the mount, which has a smaller diameter than a diameter of the respective recess. Furthermore, the third recess can have an opening to the inner side of the frame, which has a smaller diameter than a diameter of the third recess. This promotes the stability of the mount when the laser beam guidance unit moves quickly.

The transmissive optical element can be provided in the mount. Furthermore, the transmissive optical element can be at least one element selected from an optical element, a beam splitter, a phase plate, an optical filter, an optical grating, a lens, an aperture, and a protective glass. The transmissive optical element can be positioned in a beam path of the laser beam processing device and/or within a beam path of the laser beam processing device by means of the holder.

A passage can be provided for at least one of the adjusting elements, which passage is fastened in the frame, in particular in one of the through-openings of the frame. Furthermore, a laterally elastic spring element can be provided in at least one of the through-openings and/or the associated passage, within which the adjusting element is elastically mounted in the X and Y direction. This elastic mounting of the mount within the frame promotes high stability of the mount during rapid movements of the laser beam guidance unit. At least one of the adjusting elements can have a screw sleeve with an internal thread and a screw with an external thread complementary to the internal thread, wherein the external thread of the screw is rotatable in the internal thread of the screw sleeve to adjust the adjusting element. The length of the relevant adjusting element can be changed by turning the screw.

At least one element selected from the transmissive optical element, the mount, the adjusting elements, the guide pin, the bushing, the spring element, the screw sleeve, the screw, the first filling element, and the second filling element can be exchangeable. This promotes maintenance or repair of the holder. Furthermore, at least one of the adjusting elements, in particular its screw, can be designed to be adjustable with a controllable drive. At least one of the adjusting elements, in particular its screw, can be provided with a controllable drive for adjusting the adjusting element. By providing the controllable drive, an automatic centring mechanism can be implemented, which is controlled, for example, via a control unit of the laser processing device.

A further embodiment relates to a use of a holder according to any one of the preceding embodiments and variations for holding a transmissive optical element of a laser processing device and adjusting the position of the transmissive optical element in the X and/or Y direction, in particular for adjusting the position at an angle to the propagation direction of the laser beam to be guided of the laser processing device.

Another embodiment relates to a laser processing device for laser processing a workpiece, in particular a laser processing head, with a holder for a transmissive optical element according to any one of the above embodiments and variations. The frame of the holder can be integrated into a laser beam guidance unit of the laser processing device. Furthermore, a transmissive optical element provided in the mount of the holder can be positioned in a beam path of the laser processing device.

One embodiment relates to a method for adjusting the position of a transmissive optical element of a laser processing device, in particular a laser processing device according to the preceding embodiment, wherein the transmissive optical element is provided in a holder according to any one of the preceding embodiments and variations, and wherein the position of the transmissive optical element in the X and/or Y direction, in particular at an angle to the propagation direction of the laser beam to be guided of the laser processing device, is adjusted by adjusting at least one of the adjusting elements.

With the above embodiments of the method for adjusting the position of a transmissive optical element of a laser processing device, the same advantages and functions can be realized as with the embodiments of the holder for a transmissive optical element of a laser processing device, in particular with identical and/or analogous features.

A further embodiment relates to a computer program product comprising one or more program modules that cause the laser processing device according to the preceding embodiment to carry out steps of the method according to the preceding embodiment, in particular when the program modules are loaded into a memory of the laser processing device Further features and efficiencies arise from the following description of exemplary embodiments, the figures and the dependent claims. The above-mentioned features and those described below can be used without departing from the scope of the present invention not only in the respective combinations indicated, but also in other combinations or in isolation.

BRIEF DESCRIPTION OF THE SEVERAL VIEWS OF THE DRAWINGS

The invention is explained in more detail below on the basis of exemplary embodiments with reference to the accompanying drawings, which likewise disclose features that are essential to the invention. These exemplary embodiments are used for illustration purposes only and are not to be construed as limiting. For example, a description of an exemplary embodiment with a large number of elements or components should not be interpreted to the effect that all of these elements or components are necessary for implementation. Rather, other exemplary embodiments can also contain alternative elements and components, fewer elements or components, or additional elements or components. Elements or components of different exemplary embodiments can be combined with one another, unless otherwise stated. Modifications and variations which are described for one of the exemplary embodiments can also be applied to other exemplary embodiments. To avoid repetition, elements that are the same or that correspond to one another are denoted by the same reference symbols in different figures and are not explained more than once. In the figures.

DETAILED DESCRIPTION OF THE INVENTION

Figure 1:
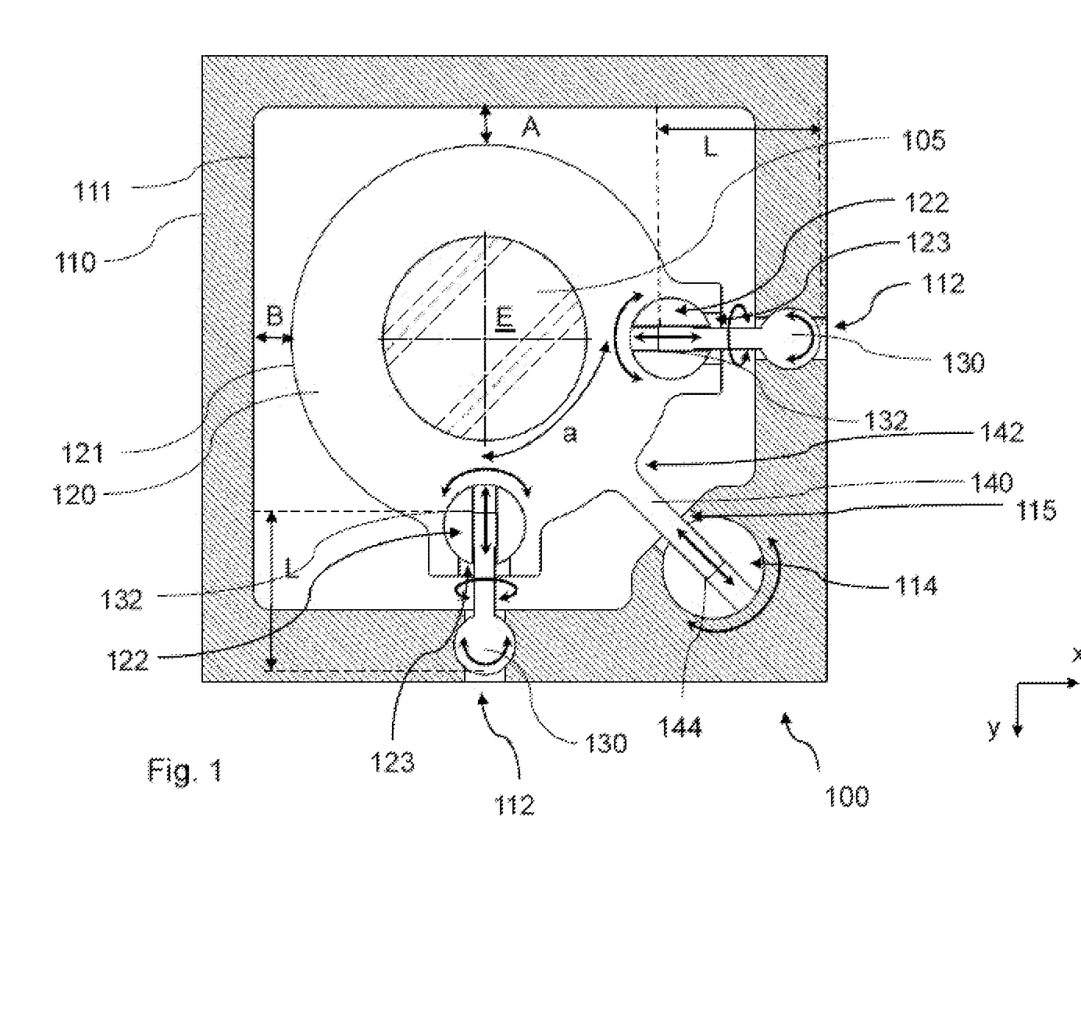
FIG. 1 schematically shows a holder according to a first embodiment.

FIG. 1 schematically shows a holder 100 for a transmissive optical element 105, also called an optical element, of a first example. The transmissive optical element 105, for example a lens, spans a plane E in an X direction and in a Y direction.

The holder 100 has a frame 110 and a mount 120 for the transmissive optical element. The mount 120 is mounted within the frame 110 with two adjusting elements 130 and with a guide pin 140 arranged between the adjusting elements 130. There are distances A and B between the inner side 111 of the frame 110 and the outer side 121 of the mount 120. In the present example, the outer side of the frame 110 is square and the inner side of the mount 120, which is used to hold the optical element 105, is circular. In other examples, other shapes of frame 110 and mount 120 may be chosen.

In the present example, the adjusting elements 130 are in the form of adjusting screws (not shown) and the guide pin 140 is in the form of a cylindrical pin. Each adjusting screw consists of a screw sleeve with an internal thread and a screw with an external thread complementary to the internal thread, wherein the external thread of the screw is rotatable in the internal thread of the screw sleeve in order to adjust the adjusting element 130. The adjusting elements 130 can be adjusted in their respective length L independently of one another. The adjusted length L can be recorded and stored to facilitate the reproducibility of the position changes.

The frame 110 has through-openings 112, which are offset at an angle α. In the present example, a 90° angle is provided as the angle α. The adjusting elements 130 are arranged radially to the mount 120 in the through-openings 112. The adjusting elements 130 have a lateral clearance within the through-openings 112 and can therefore be pivoted within the through-openings 112. This allows the frame-side end 132 of each adjusting element 130 to be pivoted on a circular path segment.

Furthermore, a recess 114 which is disc-shaped in the X and Y direction is provided in the frame 110 in the centre between the through-openings 112. The disc-shaped recess 114 has an opening 115 to the inner side of the frame 110. The frame-side end 144 of the guide pin 140 is arranged in the recess 114 with a precise fit and can be pivoted in the X and Y direction. In addition, the frame-side end 144 of the guide pin 140 can be displaced in the recess 114 in the longitudinal direction of the guide pin.

The mount 120 has two disc-shaped recesses 122 offset by 90° in the X and Y directions. The recesses 122 are positioned complementary to the through-openings 112 of the frame. The disc-shaped recesses 122 each have an opening 123 to the outer side of the mount 120. In the recesses 122, the frame-side ends 132 of the adjusting elements 130 are arranged with a precise fit and are pivotable on circular path segments in the X and Y directions. Furthermore, the frame-side ends 132 of the adjusting elements 130 are provided in the recesses 122 so as to be displaceable in the longitudinal direction of the respective adjusting element. Furthermore, the guide pin 140 is fastened with its mount-side end 142 on the outer side of the mount 120 in the middle between the recesses 122.

The openings 123 of the recesses 122 to the outer side of the mount 120 and the opening 115 of the recess 114 to the inner side of the frame 110 have a smaller diameter in comparison to the maximum diameter of the respective recess in the present example. As a result, the deflections of the adjusting elements 130 and the guide pin 140 in the X and Y directions are limited.

The respective lengths L of the adjusting elements 130, the length of the guide pin 140 within the recess 114, the respective angle that the longitudinal direction of the adjusting elements 130 makes with respect to a diagonal of the frame 110, and the angle that the longitudinal direction of the guide pin 140 makes with respect to the diagonal of the frame 100 occupies are variable via the two adjusting elements 130, the guide pin 140 and five pivot points. In the present example, the diagonal from the bottom right corner of the frame to the top left corner of the frame is selected as the straight reference line for the angles mentioned in the frame 110 shown in FIG. 1. In the position of the mount shown in FIG. 1, the respective angle that the longitudinal direction of the adjusting elements 130 occupies to the diagonal of the frame 110 is 45°, and the angle that the longitudinal direction of the guide pin 140 occupies to the diagonal of the frame 100 is 0°.

By adjusting the length L of at least one of the adjusting elements 130, the position of the mount 120 within the frame 110 is changed in the X direction and/or Y direction. In other words, the distances A and B between the mount 120 and the frame 110 are changed. This can be seen in FIG. 2 from the adjusted position of the holder 120, which is shown in dashed lines. In the position of the mount 120 shown in dashed lines in FIG. 2, the distance A is reduced, starting from the position of the mount 120 shown in FIG. 1, while the distance B is increased. By adjusting at least one of the lengths L of the adjusting elements 130, the length of the guide pin 140 within the recess 114, the respective angle that the longitudinal direction of the adjusting elements 130 makes with respect to the diagonal of the frame 110, and the angle that the longitudinal direction of the guide pin 140 makes with respect to the diagonal of the frame 100, is changed. Since the lengths L of the adjusting elements 130 can be adjusted independently of one another, almost any desired point in the area around the centre of the frame 110 can be approached with the optical axis of the optical element 105. In addition, the adjusting mechanism of the holder 100 can be precisely adjusted.

Figure 2:
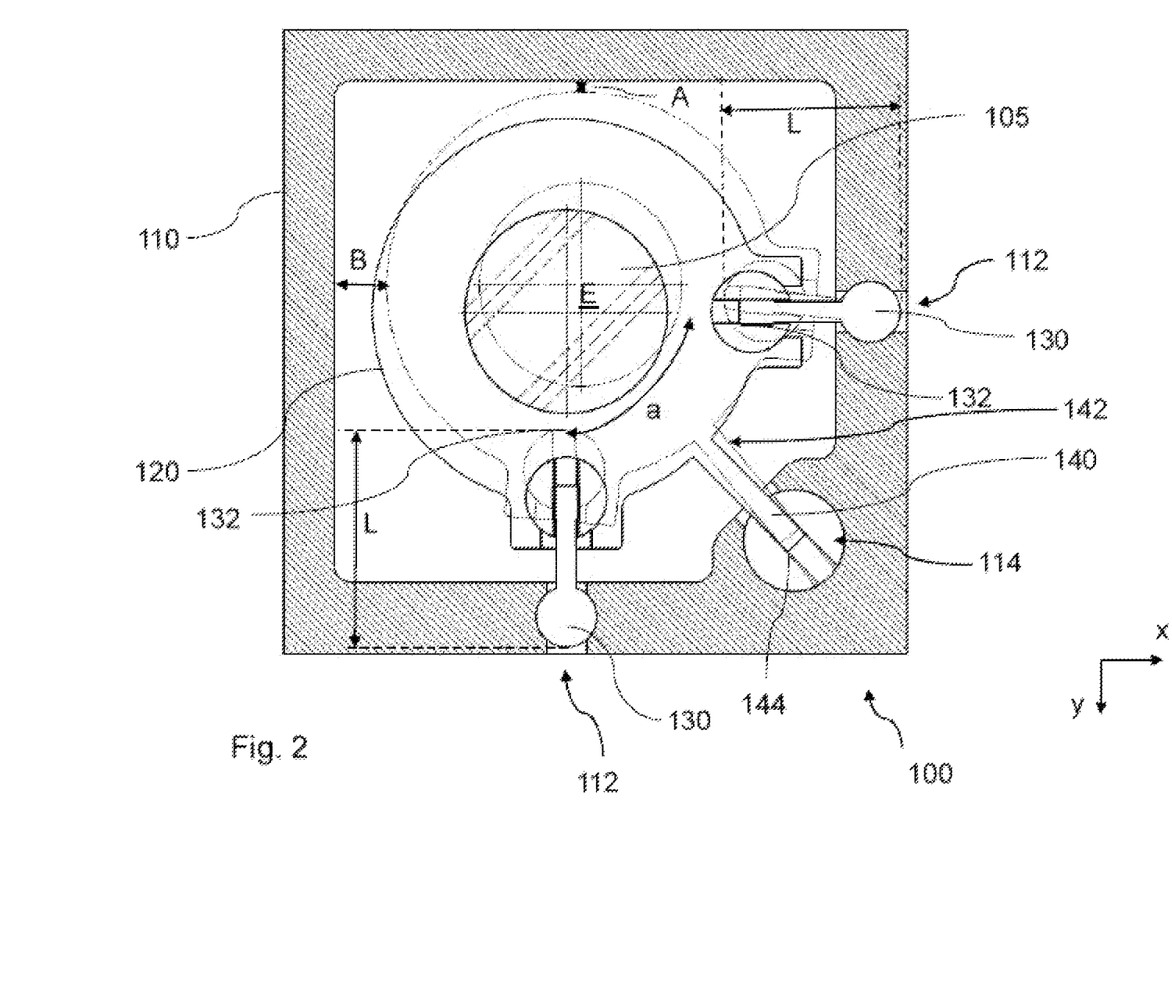
FIG. 2 schematically shows the holder of the first exemplary embodiment with an adjusted mount.

In order to adjust the mount 120 from the position shown in FIG. 1 to the position shown in dashed lines in FIG. 2, the adjusting elements 130 are lengthened. The mount-side ends 132 of the adjusting elements 130 are displaced in the longitudinal direction thereof in the recesses 122 of the mount 120. The adjusting elements 130 are pivoted in the recesses 122 of the frame 110. The mount-side ends 132 of the adjusting elements 130 and the frame-side end 144 of the guide pin 140 are pivoted in or parallel to the plane E in the X and/or Y direction, each on circular path segments. In addition, the frame-side end 144 of the guide pin 140 is displaced in its longitudinal direction in the recess 114 of the frame 110. The adjusted lengths L are recorded and stored in order to keep the position changes of the mount 120 reproducible. In this way, the position of the mount 120 shown in dashed lines in FIG. 2 is adjusted precisely, reproducibly and essentially without material abrasion, while the mount remains stably mounted in the frame.

The holder 100 enables stable mounting of the mount 120 in the frame 110, while a variety of positions of the mount 120 in or parallel to the plane E, i.e., in the X and/or Y direction, can be reached. The latter is promoted by the fact that the adjusting elements 130 can be adjusted in their length L independently of one another. The holder thus enables a precise and reproducible adjustment of the mount in the X direction and in the Y direction.

Figure 3:
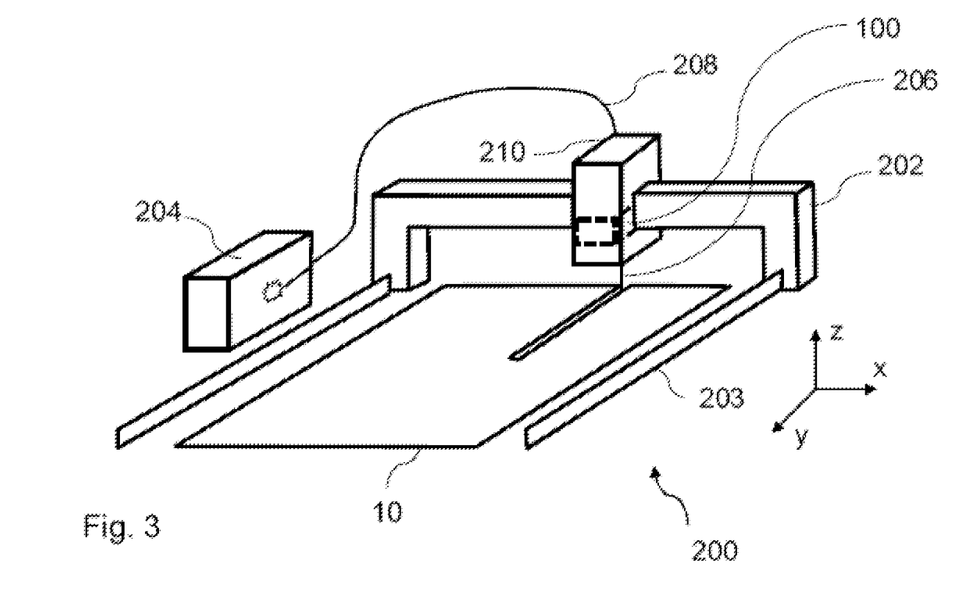
FIG. 3 schematically shows a laser processing device with an integrated holder of the first exemplary embodiment.

FIG. 3 schematically shows a laser processing device 200 of an example, which is embodied as a laser cutting device with a cutting head 210. The device 200 has a laser source 204 for generating a laser beam 206 which is guided into a cutting head 210 by means of a transport fibre 208. The laser beam 206 can be directed onto a workpiece 10 in a Z direction with the cutting head 210. The device 200 includes a cutting head movement unit 202, 203, with which the cutting head 210 and thus the laser beam 206 guided therein can be moved in the cutting direction in the X and/or Y direction over the workpiece 10. The cutting head moving unit contains a bridge 202 on which the cutting head 210 is arranged to be displaceable in the X direction and a carriage 203 on which the bridge 202 can be moved in the Y direction. With the cutting head moving unit, the cutting head 210 can also be moved perpendicular to the workpiece 10, i.e., in the Z direction. In the present example, the laser processing device 200 has a control unit (not shown) with a memory. The cutting head moving unit 202, 203 is connected to the control unit by wired or wireless data transmission. The holder 100 of FIG. 1 with the optical element 105 provided in the mount 120 is integrated into the cutting head 210. In the present example, the adjusting elements 130 (not shown in FIG. 3) are arranged on the outer side of the cutting head 210. The holder 200 is positioned in such a way that the laser beam 206 generated during operation passes through the optical element 105 in the Z direction perpendicular to the plane E, i.e., perpendicular to the X and Y directions.

If the position of the optical element 105 in the beam path is to be changed in the X and/or Y direction outside the operation of the laser processing device 200, e.g., during maintenance of the cutting head 210, the adjusting elements 130 on the outer side of the cutting head are operated manually. In this way, the optical element 105 is displaced in the beam path of the laser beam perpendicular to the direction of propagation of the laser beam 206. For example, the optical element is precisely centred in the optical path of the laser beam 206, wherein the optical axis of the optical element 105 is made substantially coincident with the central axis of the laser beam.

Figure 4:
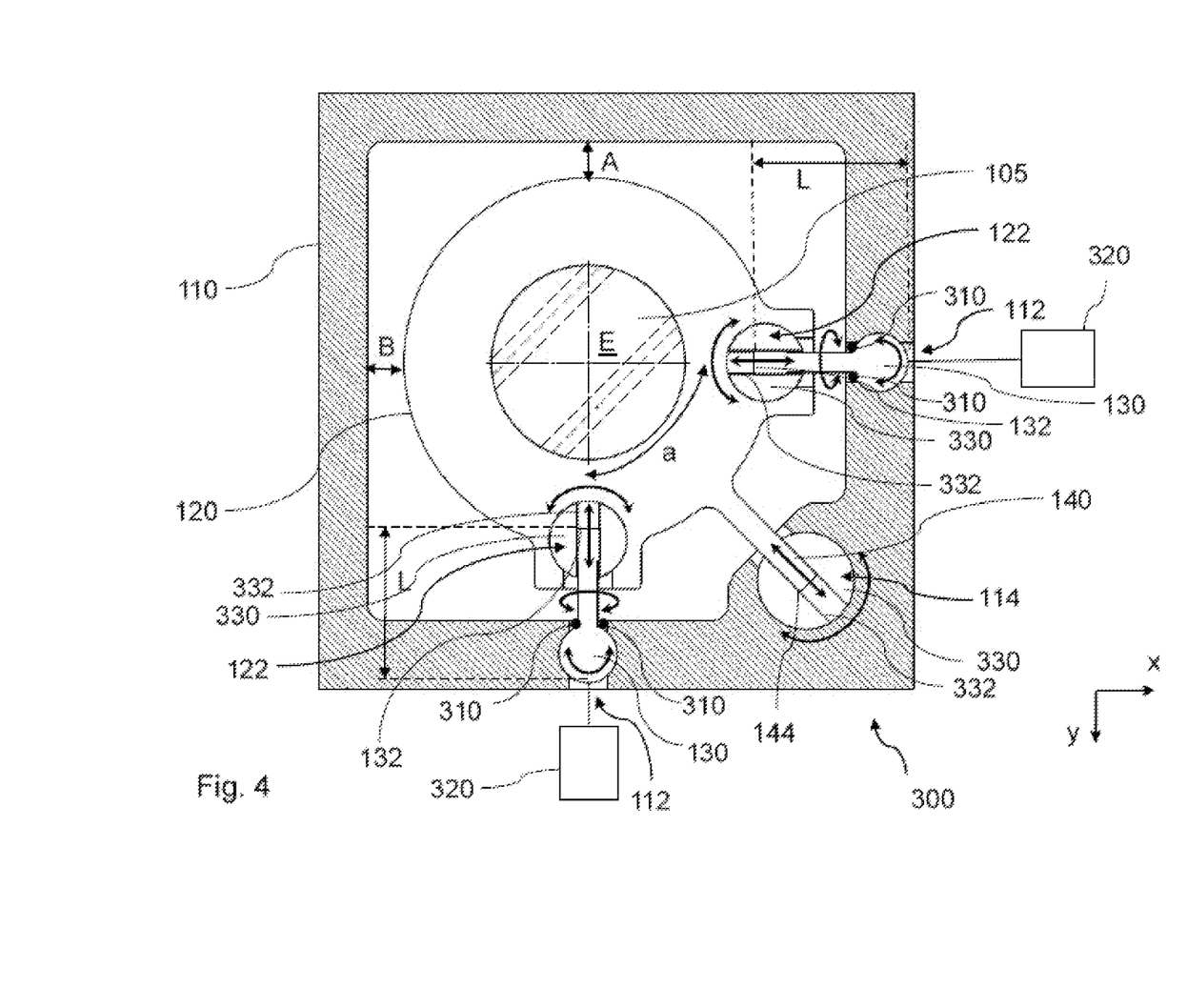
FIG. 4 schematically shows a holder according to a second embodiment.

FIG. 4 schematically illustrates a holder 300 as a second example. Compared to the holder 100 of FIG. 1, elastic spring elements 310 are additionally provided in the through-openings 112 of the holder 300, within which the adjusting elements are elastically mounted laterally in the X and Y directions. In the present example, the disc-shaped recesses 122 and the recess 114 each contain a precisely fitting rotatable disc-shaped filling element 330 made of a low-abrasion, temperature-resistant plastic that is mounted with a precise fit. The material of the filling element 330 can also contain or consist of a metal, e.g., stainless steel, aluminium or brass. The filling elements 330 each contain a guide 332 for receiving the mount-side ends 132 of the adjusting elements 130 with a precise fit or for receiving the frame-side end 144 of the guide pin 140 with a precise fit. The mount-side ends 132 of the adjusting elements 130 or the frame-side end 144 of the guide pin 140 can be displaced within the guides 332. These measures increase the stability of the holder when the cutting head 210 moves quickly. In further examples, a passage (not shown) for receiving the adjusting elements 130 and/or the elastic spring elements 310 is fastened inside the through-openings 112.

Furthermore, the adjusting elements 130 of the holder 300, in particular its screw, are each designed to be adjustable with a controllable drive and are provided with a controllable drive 320, for example a servo motor, for adjusting the adjusting element 130. If the holder 300 is integrated into the cutting head 210 of the laser processing device 200, the controllable drive 320 is connected to its control unit (not shown) in a data-conducting manner either by wire or wirelessly. In this way, the controllable drive 320 implements an automatic adjusting mechanism, for example an automatic centring mechanism, which is controlled via the control unit of the laser processing device 200 and which can also be used during operation of the laser processing device. Furthermore, the holder 300 or the entire cutting head 210 in which it is integrated can be miniaturised in this way.

The scope of protection of the present invention is given by the claims and is not limited by the features illustrated in the description or shown in the figures.

The invention claimed is:

1. A holder (100; 300) for a transmissive optical element (105) of a laser processing device (200), having
a frame (110) for receiving in a laser beam guidance unit (210) of the laser processing device and
a mount (120) for the transmissive optical element, wherein the transmissive optical element spans a plane (E) in an X direction and a Y direction,
wherein the mount is mounted within the frame with two adjusting elements offset at an angle of 80 degree to 100 degree to one another in or parallel to the plane and is adjustable in the X direction and/or the Y-direction in each case at its distances to the frame,
wherein the adjusting elements (130) are each mounted in the frame (110) such that they can pivot in the X and Y directions;
the mount side ends (132) of the adjusting elements (130) are each mounted in the mount (120) in the X and Y directions so that they can pivot;
the adjusting elements are each mounted in the frame such that they are adjustable independently of one another in their respective length between the mount and the frame
the mount-side ends of the adjusting elements are each mounted in the mount in the X and Y directions so that they are displaceable in the longitudinal direction of the respective adjusting element;
the mount is mounted with a guide pin arranged in or parallel to the plane between, in particular centrally between, the two adjusting elements radially to the frame;
a mount-side end (142) of the guide pin (140) is fixed to the mount (120); and the frame-side end (144) of the guide pin (140) is mounted in the frame (110) such that it can pivot in the X and Y directions and is displaceable in the longitudinal direction of the guide pin.

2. The holder according to claim 1, wherein
the frame comprises two through-openings configured to receive the adjusting elements, and the adjusting elements are elastically mounted in the through-opening so as to pivot in the X and Y direction, and/or
the mount comprises a first recess and a second recess arranged on its outer side and configured to receive the socket-side end of the adjustment elements, wherein the first and second recesses are arranged complementary to the through-openings.

3. The holder according to claim 2, wherein the through-openings of the frame are arranged offset by 90° and the first recess and the second recess of the mount are arranged offset by 90°.

4. The holder according to claim 1, wherein
the frame comprises a third recess arranged on its inner side and configured to receive the frame-side end of the guide pin, and/or the mount-side end of the guide pin is fixed to the outer side of the mount in a position complementary to the third recess.

5. The holder according to claim 2,
wherein the third recess is arranged between the through-openings of the frame; and/or
wherein the third recess is arranged centrally between the through-openings of the frame, and/or
wherein the guide pin is fixed between the first and the second recess of the mount; and/or
wherein the guide pin is fixed centrally between the first and second recesses of the mount.

6. The holder according to claim 2, wherein at least one of the first recess and the second recess (122) is disc-shaped within the mount (120) in the X and Y directions; and/or
wherein at least one of the first recess and the second recess (122) comprises a disc-shaped first filling element (330) rotatable in a circle in the X and Y directions within the respective recess; and/or
wherein the first filling element (330) comprise first guide (332) configured to receive the mount-side end (142) of one of the adjusting elements.

7. The holder according to claim 4,
wherein the third recess is formed within the frame disc-shaped in the X and Y directions; and/or
wherein the third recess comprises a disc-shaped second filling element rotatable in a circle within the third recess in the X and Y directions; and/or wherein the second filling element comprises a second guide configured to receive the frame-side end of the guide pin.

8. The holder according to claim 2,
wherein at least one of the first recess and the second recess comprises an opening to the outer side of the mount, the mount comprising a smaller diameter compared to a diameter of the at least one of the first recess and the second recess; and/or
wherein the third recess comprises an opening to the inner side of the frame, the opening comprising a smaller diameter than a diameter of the third recess.

9. The holder according to claim 1, wherein the transmissive optical element is arranged in the mount, and/or
wherein the transmissive optical element is at least one element selected from an optical element, a beam splitter, a phase plate, an optical filter, an optical grating, a lens, an aperture and a protective glass; and/or
wherein the transmissive optical element is configured to be positioned in a beam path of the laser beam processing device and/or within a beam path of the laser beam processing device by means of the holder.

10. The holder according to claim 1, wherein a bushing is provided for at least one of the adjusting elements which is fastened in the frame or in one of the through-openings of the frame; and/or
wherein a laterally elastic spring element is arranged in at least one of the through-openings and/or the associated passage, within which the adjusting element is mounted elastically in the X and Y directions; and/or
wherein at least one of the adjusting elements comprises a screw sleeve with an internal thread and a screw with an external thread complementary to the internal thread,
wherein the external thread of the screw is rotatable in the internal thread of the screw sleeve to adjust the adjusting element.

11. The holder according to claim 1, wherein at least one element selected from the transmissive optical element, the mount, the adjusting elements, the guide pin, the bushing, the spring element, the screw sleeve, the screw, the first filling element, and the second filling element can be exchanged; and/or
wherein at least one of the adjusting elements or its screw is designed to be adjustable with a controllable drive; and/or
wherein at least one of the adjusting elements or its screw is provided with a controllable drive for adjusting the adjusting element.

12. A laser processing device for laser processing a workpiece or a laser processing head with a holder for a transmissive optical element according to claim 1;
- wherein the frame of the holder is integrated into a laser beam guiding unit of the laser processing device; and/or
- wherein a transmissive optical element arranged in the mount of the holder is positioned in a beam path of the laser processing device.

13. A method for adjusting the position of a transmissive optical element of a laser processing device or a laser processing device according to claim 12, wherein the transmissive optical element is arranged in a holder according to claim 1, wherein the position of the transmissive optical element in the X and/or Y direction or at an angle to the propagation direction of the laser beam to be guided of the laser processing device, is adjusted by adjusting at least one of the adjusting elements.

\* \* \* \* \*